UNITED STATES PATENT OFFICE.

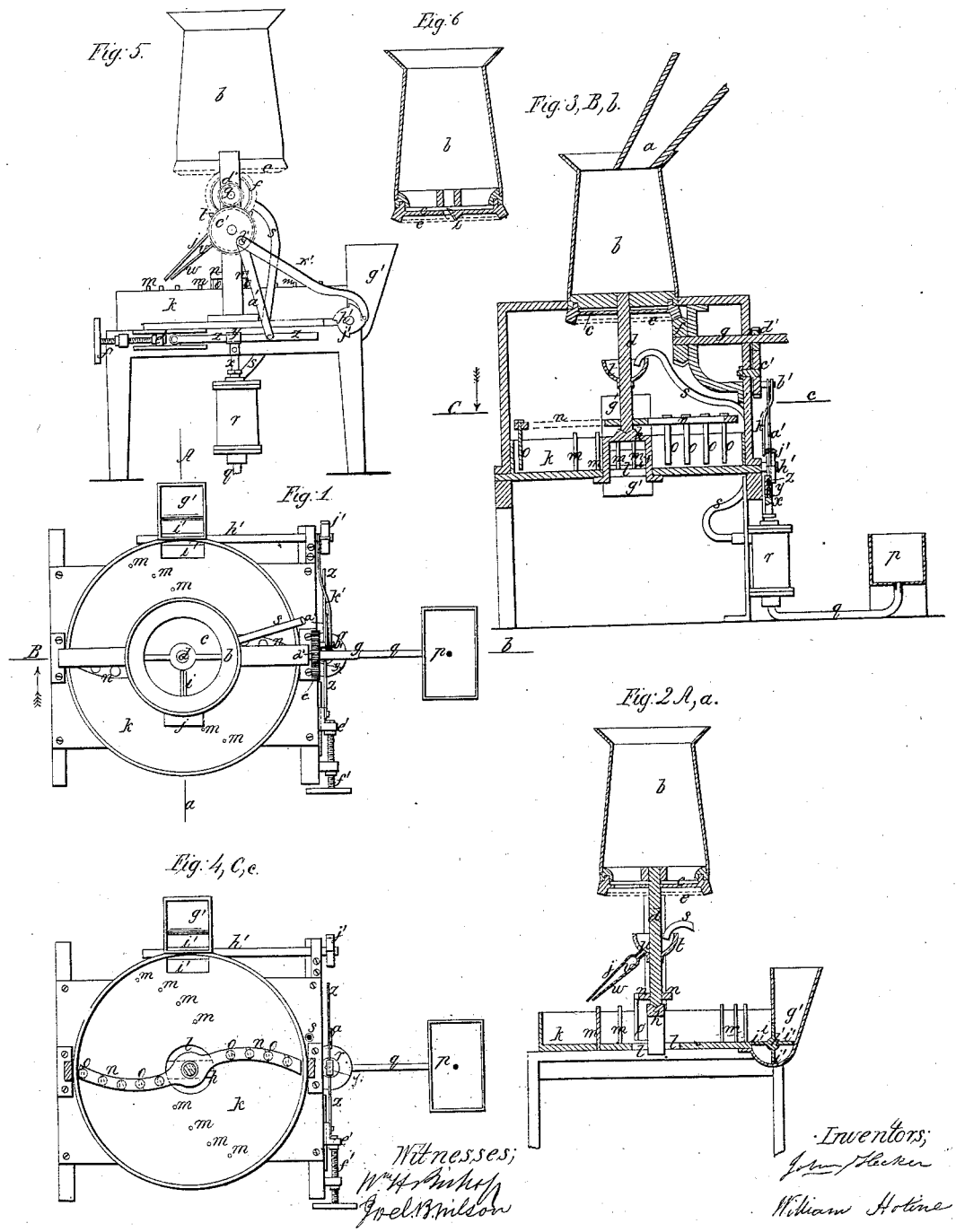

JOHN HECKER AND WILLIAM HOTINE, OF NEW YORK, N. Y., ASSIGNORS TO SAID HECKER.

MACHINE FOR FEEDING THE FLOUR, MIXING THE MATERIALS, AND KNEADING DOUGH.

Specification of Letters Patent No. 18,723, dated November 24, 1857.

*To all whom it may concern:*

Be it known that we, JOHN HECKER and WILLIAM HOTINE, both of the city, county, and State of New York, have invented a Machine for Feeding Flour and Mixing and Kneading Dough for the Making of Bread, Crackers, &c.; and we do hereby declare that the following is a full, clear, and exact description thereof, reference being had to the accompanying drawings, making part of this specification, in which—

Figure 1 is a plan of the machine; Figs. 2 and 3 vertical sections taken at the lines A, *a* and B, *b* of Fig. 1; and Fig. 4 a horizontal section taken at the line C, *c* of Fig. 3; Fig. 5 is a side elevation and Fig. 6 a vertical section of the feeding trough and cutter at the bottom thereof for cutting or scraping off and delivering the flour in the required quantity.

The same letters indicate like parts in all the figures.

The object of our invention is to effect the thorough admixture of the flour and water, or other fluid, and of the sponge, if applied to the making of dough for fermented bread, by acting on small quantities at a time, but by a continuous operation, so that all parts of the operation shall be going on at the same time from the feeding in of the ingredients to the delivery of the finished dough, instead of acting upon an entire charge at once. The flour and water or other fluid are supplied in thin films or sheets and in close proximity with each other, and in continuous streams, at or near the periphery of a circular trough, where the sponge is also supplied when making dough for fermented bread, where the operation of admixture begins, and where it can be carried on advantageously by reason of acting on small quantities, and as the operations of admixture and kneading progress the matter is gradually forced toward the center where the finished dough is delivered, the supply of the ingredients and the delivery of the finished dough being continuous until the required quantity of dough has been produced. And one of the special objects of our said invention is to effect the feeding in or supply of the flour in such manner as to avoid the tendency which flour has to pack, which tendency has heretofore presented serious difficulties in operating on flour, particularly in damp weather.

In the accompanying drawings (*a*) represents a suitable hopper to supply the flour to a feeder (*b*) which said feeder is a hollow vessel in the form of a frustum of a cone, that is with the base of larger diameter than the upper end which receives the flour from the hopper. To the lower end of this feeder and forming the bottom thereof is fitted a disk (*c*), mounted on a vertical shaft (*d*), with which it rotates, the under part of the disk being provided with cogs (*e*) which are engaged by the cogs of a bevel pinion (*f*) on the driving shaft (*g*) receiving motion from some first mover, to rotate the disk at the required velocity. The lower end of the shaft (*d*) rests on a step (*h*), and the journal at the upper end is fitted to turn in a bridge across the lower end of the feeder. There is a radial slot in the disk extending from the hub to within a short distance of the periphery, and to one face of this slot is fitted an oblique cutter or scraper (*i*) attached in the manner of a plane iron, so that its upper cutting or scraping edge can be adjusted to any required set above the plane of the upper surface of the disk. The feeder being filled with flour, as the disk at the bottom rotates the cutter or scraper shaves off at each revolution a quantity of flour equal to the set of the said cutter above the upper surface of the disk, which flour so cut or scraped off falls through the slot onto the upper inclined suface of an inclined plate (*j*) attached to and revolving with the shaft (*d*), by means of which the flour is scattered and discharged all around into the mixing pan or trough (*k*) below, and near the rim thereof. As the feeder is conical, that is with its inner diameter gradually larger from the upper to the lower end, the whole weight of the flour within it rests on the disk forming the bottom, so that whatever tendency the flour may have to pack, if the bottom disk were removed, it would fall out, hence the disk at the bottom sustains the entire weight of the charge of flour, and in consequence of this as the disk rotates and the cutter or scraper removes and discharges a slice or film from the lower end at each revolution the entire mass descends freely to feed or supply itself to the said cutter or scraper. In this way all tendency to pack is entirely avoided, the surrounding conical feeder acting merely as a guide or lateral support. And if the entire mass of flour within the feeder should become packed into a mass it will be effectually separated by the action of the cutter or scraper, and finally broken and separated by falling onto the scattering plate below, so that by these means we not only insure a regular supply of the flour, but deliver it to the trough in a thoroughly separated state, which is very important in making dough.

The mixing pan or trough (k) is a flat cylindrical vessel with a central discharge hole (l) and with vertical blades or pins (m) projecting from the bottom, and at given distances apart from the central discharge hole toward the rim. The pins or blades (m) are set on curved or tangent lines, one row on each side of the central discharge hole (l) but the number or rows may be increased or diminished, and they may be set on tangent or other lines.

The shaft (d) near the lower end thereof, carries two horizontal arms (n, n) provided with vertical blades (o, o) extending down to, and just clearing the bottom of the mixing trough, and they are so placed that each blade will pass in a space between two of the pins (m) in the pan, and the inner face of each blade should be tangent to a circle of less diameter than the circle it generates in its revolution, so that the series of blades acting on the flour to be mixed and passing between the pins (m) in the trough will not only effect the mixing of the ingredients and the working of the dough, but will gradually move the mass toward, and finally when sufficiently worked, discharge it through the central hole into any suitable vessel to be there placed for the purpose of receiving it.

By the means above described the quantity of flour to be discharged into the mixing pan at each revolution can be regulated with the utmost accuracy; but it is necessary also to supply the water or other fluid and the sponge regularly and in the required quantities. The water or other fluid of the required temperature, is drawn from a vat (p) through a pipe (q) by a pump (r) and forced up through a pipe (s) and discharged into a cup (t) attached to and surrounding the shaft (d), and it escapes from the bottom of this cup through an inclined pipe (u) into a flat channel way (v) between the under surface of the inclined plate (j) and another plate (w) below it, and as the flour falls from the feeder onto the plate (j) by which it is scattered and delivered near to the rim of the mixing through in a thin sheet or film, the fluid is delivered in the same direction and also in a thin sheet or film so as to effect a thorough admixture of the fluid and flour. The piston rod (x) of the pump is provided with a bridle (y) in which a lever (z) slides freely. This lever receives motion for working the pump by a connecting rod (a') from a crank pin (b') on a wheel (c') receiving motion from the driving shaft by a pinion (d'), and the opposite end of the lever turns on a fulcrum pin on a block (e') sliding in suitable ways in the frame, so that by means of a set screw (f') the fulcrum pin can be moved from or toward the pump to increase or decrease the stroke of the pump piston and hence the quantity of fluid to be discharged into the mixing trough at each stroke of the pump. The water or other fluid can be maintained at the required temperature in the vat, or supplied thereto, or directly to the pump in any other suitable manner; but however, supplied care should be taken to have it at the required temperature for reasons well known to bakers, and it will be obvious that the water or other fluid may be supplied to the channel way, and the quantity regulated by other and equivalent means; but that which we have described above we have applied with entire success.

The sponge, which is the prepared leaven of any suitable kind, is put into a hopper (g') the lower end of which opens into the mixing trough; and at the junction of this hopper and trough there is a shaft (h') with four wings (i') at equal distances apart, forming four compartments to receive the sponge. The outer end of the shaft is provided with a ratchet wheel (j') having four teeth which are acted upon, one at a time, by a rod (k') receiving motion from the crank pin which operates the pump, to turn the shaft a quarter of a revolution at each revolution of the crank. The wings on the shaft and the teeth on the ratchet wheel are so placed that at the end of each motion one compartment is brought around to deliver the sponge it contains into the trough, and there rest until the next revolution of the crank, one wing closing up the aperture in the bottom of the trough leading into the hopper, and another wing in like manner closing up the aperture in the rim of the trough during the state of rest. In this way one measure of sponge is delivered into the mixing trough at each revolution of the crank and hence at each stroke of the pump and each revolution of the shaft which carries the mixing blades, and although we have described the use of rotating wings forming compartments between them for supplying the sponge or other leaven regularly, and this mode of application has been practically successful, we do not wish to be understood as limiting our claim of invention to the use of such special mode of application as other and equivalent modes may be substituted. But we deem it important to have the sponge as also the flour and fluid delivered at or near the periphery of the mixing trough to insure the thorough admixture of the ingredients from the time they reach the trough until the whole mass is worked and gradually carried toward the central discharge hole. In this way it will be seen that the supply of the ingredients is constant and regular, and that the process of admixture begins at the moment the delivery of the ingredients to the trough begins, and every part of the charge, in subdivision, is carried regularly through every part of the process of admixture, working, kneading, and delivery as dough, instead of acting upon the entire mass at once, as many have attempted; and it will be seen that by thus acting continuously upon a continuous supply a better or more perfect and more economical result can be obtained than by acting upon the entire mass at once.

Instead of sponge, other leaven may be supplied by the means above described, or by equivalent means, but if dough is to be produced for making unleavened bread it is only necessary to suspend the operation of the ratchet to stop the revolutions of the wings, or if it be desired to make leavened, but unfermented bread, the leavening ingredients may be mixed with the water or other fluid or with the flour before introducing them into the trough.

We do not deem it necessary to specify the various kinds of fluids which may be used in mixing the dough, as these are well known to bakers and make no part of our invention.

We do not wish to be understood as limiting our claim of invention to the employment of all the parts of our said invention in connection, as important results may be obtained by the use of some of them without the others, as, for instance, the method of feeding the flour and preventing it from packing may be advantageously employed with any other mode of mixing and supplying the fluid, and in fact may be advantageously employed for feeding flour for other purposes, and the method of distributing and mixing the flour and supplying the fluid and the sponge may be advantageously employed with any other efficient mode of feeding or supplying the flour, and so with the other parts of our invention.

What we claim as our invention and desire to secure by Letters Patent is—

1. The employment of the rotating disk with its slot and cutter or scraper, one or more, substantially as described, in combination with and forming the movable bottom of a vessel containing a supply of flour, to deliver the flour in regular given quantities, as set forth.

2. We also claim in combination with the rotating disk or bottom, substantially as described, the making of the feeder or vessel, containing the supply of flour, conical and with the lower end largest, substantially as described, to prevent the packing of the flour, as described.

3. We also claim in combination with the feeder or its equivalent, and the mixing trough, the inclined revolving plate for scattering and distributing the flour at or near the periphery of the mixing trough, substantially as and for the purpose specified.

4. We also claim in combination with the mixing trough, and the flour distributer, the revolving channel way along the under side of the distributer, for distributing the water or other fluid, and the water, at or near the periphery of the mixing trough, substantially as described, to insure the proper admixture of the ingredients, as set forth.

5. We also claim in combination with the flour and water feeders, or their equivalents, the apparatus, or any equivalent therefor, for feeding and supplying the sponge or other leaven at or near the periphery of the mixing trough, substantially as specified.

6. And finally we claim the revolving blades and stationary pins or blades, substantially as described, in combination with a mixing trough having a discharge aperture, at or near the center, and the means herein described or their equivalents for feeding the flour and mixing fluid at or near the periphery of the trough, substantially as described, for mixing the ingredients as they are received, and gradually working and kneading them, and forcing them toward the center where the dough is delivered, substantially as described.

JOHN HECKER.
WILLIAM HOTINE.

Witnesses:
Wm. H. Bishop,
Joel. B. Wilson.